(12) United States Patent
He (10) Patent No.: US 11,790,864 B1
(45) Date of Patent: Oct. 17, 2023

(54) DISPLAY PANEL AND DRIVING METHOD THEREOF

(71) Applicant: TCL China Star Optoelectronics Technology Co., Ltd., Shenzhen (CN)

(72) Inventor: Wu He, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/963,212

(22) Filed: Oct. 11, 2022

(30) Foreign Application Priority Data

Jul. 28, 2022 (CN) .......................... 202210903776.9

(51) Int. Cl.
  *G09G 3/36* (2006.01)
  *G02F 1/1335* (2006.01)
  *G02F 1/1343* (2006.01)

(52) U.S. Cl.
  CPC ..... *G09G 3/3607* (2013.01); *G02F 1/133514* (2013.01); *G02F 1/134309* (2013.01)

(58) Field of Classification Search
  CPC ............ G09G 3/3607; G02F 1/133514; G02F 1/134309; G02F 1/1339–13398
  See application file for complete search history.

(56) References Cited

U.S. PATENT DOCUMENTS

| | | | |
|---|---|---|---|
| 2010/0225608 A1* | 9/2010 | Zhou | G02F 1/133512 445/24 |
| 2012/0086665 A1* | 4/2012 | Song | G06F 3/0412 345/173 |
| 2014/0028535 A1 | 1/2014 | Min et al. | |
| 2019/0163024 A1* | 5/2019 | Tominaga | G02F 1/134309 |

FOREIGN PATENT DOCUMENTS

| | | |
|---|---|---|
| CN | 201867559 U | 6/2011 |
| CN | 104142593 A | 11/2014 |
| CN | 107678216 A | 2/2018 |
| CN | 108873423 A | 11/2018 |
| CN | 108873524 A | 11/2018 |
| CN | 114740648 A | 7/2022 |
| KR | 20180134039 A | 12/2018 |

OTHER PUBLICATIONS

Chinese Office Action issued in corresponding Chinese Patent Application No. 202210903776.9 dated May 13, 2023, pp. 1-7.

* cited by examiner

*Primary Examiner* — Sanghyuk Park
(74) *Attorney, Agent, or Firm* — Nathan & Associates; Menachem Nathan (57) ABSTRACT

The present application provides a display panel and a driving method thereof. The display panel includes an array substrate with a terminal portion and a color filter substrate with a common electrode layer. The display panel further includes a first detection terminal, a second detection terminal arranged away from the terminal portion, first electrical connection wires, and a second electrical connection wire. Both the first detection terminal and the second detection terminal are electrically connected to the common electrode layer. The first detection terminal and the second detection terminal are respectively electrically connected to the terminal portion through corresponding first electrical connection wires. The first detection terminal and the second detection terminal are electrically connected through the second electrical connection wire.

18 Claims, 5 Drawing Sheets

DISPLAY PANEL AND DRIVING METHOD THEREOF

CROSS-REFERENCE TO RELATED APPLICATIONS

This application claims priority to Chinese Patent Application No. 202210903776.9 filed on Jul. 28, 2022, titled "DISPLAY PANEL AND DRIVING METHOD THEREOF", which is incorporated by reference in its entirety in the present application.

TECHNICAL FIELD

The present application relates to a display field, and particularly, to a display panel and a driving method thereof.

BACKGROUND

Liquid crystal displays (LCDs) are widely-used flat panel displays, which realize an image display mainly by modulating a light field intensity of a backlight source through a liquid crystal switch.

In an existing display panel, due to a coupling capacitance between a data line and a common electrode of a color filter substrate, when a voltage of the data line changes, a voltage of the common electrode of the color filter substrate cannot recover quickly after changing, resulting in horizontal crosstalk on the display panel. At present, a voltage compensation point is arranged on the common electrode of the color filter substrate to improve the above technical problem. However, in a large-sized display panel, for voltage compensation points arranged at two ends of the display panel, a difference in resistance, capacitance, and driving voltage may cause a technical problem that display images of different regions after compensation are different.

Therefore, there is an urgent need for a display panel to solve the above technical problems

SUMMARY

The present application provides a display panel and a driving method thereof, so as to solve a technical problem that a common electrode of a color filter substrate of an existing display panel causes differences in display images of different regions after voltage compensation.

In order to solve the above-mentioned problem, technical solutions provided by the present application are as follows:

The present application provides a display panel, which includes an array substrate and a color filter substrate arranged opposite to the array substrate. The color filter substrate includes a common electrode layer, and the array substrate includes a terminal portion.

The display panel further includes:

a first detection terminal and a second detection terminal arranged away from the terminal portion, both the first detection terminal and the second detection terminal being electrically connected to the common electrode layer;

first electrical connection wires, the first detection terminal and the second detection terminal being respectively electrically connected to the terminal portion through the corresponding first electrical connection wires; and a second electrical connection wire, the first detection terminal and the second detection terminal being electrically connected through the second electrical connection wire.

In the display panel of the present application, the display panel further includes a frame sealant arranged between the array substrate and the color filter substrate.

In a direction of the top view of the display panel, both the first detection terminal and the second detection terminal are arranged to overlap with the frame sealant.

In the display panel of the present application, the first electrical connection wires are arranged on the array substrate, and the second electrical connection wire is arranged on the array substrate or the color filter substrate.

In the display panel of the present application, the array substrate includes a light shielding layer, a gate layer, and a source and drain layer.

The first electrical connection wires and the second electrical connection wire are arranged in a same layer as one of the light shielding layer, the gate layer, and the source and drain layers.

In the display panel of the present application, the detection terminal(s) include metal balls arranged in the frame sealant, the metal balls extend from the array substrate towards the color filter substrate, and the metal balls electrically connect the first electrical connection wires and the common electrode layer.

In the display panel of the present application, a distance between the first detection terminal and the second detection terminal in a first direction is a first distance, a distance between the first detection terminal and an adjacent first boundary in the first direction is a second distance, and a distance between the second detection terminal and an adjacent second boundary in the first direction is a third distance.

The first boundary and the second boundary are opposite and parallel boundaries of the display panel, and the first direction is perpendicular to the first boundary or the second boundary.

A sum of the second distance and the third distance is equal to the first distance.

In the display panel of the present application, the display panel further includes:

a third detection terminal, wherein the third detection terminal is arranged between the first detection terminal and the second detection terminal, and the third detection terminal is respectively electrically connected to the first detection terminal and the second detection terminal through the second electrical connection wire.

In the display panel of the present application, a distance between the third detection terminal and the first detection terminal in the first direction is equal to a distance between the third detection terminal and the second detection terminal in the first direction.

In the display panel of the present application, the display panel further includes:

a pixel electrode layer arranged on the array substrate;

a fourth detection terminal arranged in a display region, and the fourth detection terminal and the pixel electrode layer being arranged in a same layer; and a support column arranged on the array substrate;

wherein the fourth detection terminal laps over the support column and is electrically connected to the common electrode layer.

The present application further proposes a driving method for a display panel, which includes:

providing a display panel;

obtaining a target voltage of a common electrode layer in the display panel;

using a first detection terminal to obtain a first voltage of the common electrode layer at a first position, and using a second detection terminal to obtain a second voltage of the common electrode layer at a second position;

obtaining a first difference between the first voltage and the target voltage and a second difference between the second voltage and the target voltage;

when the first difference or/and the second difference are greater than a threshold voltage, using a corresponding detection terminal to compensate for a voltage of the common electrode layer.

Beneficial effects: the present application proposes a display panel and a driving method thereof. The display panel includes an array substrate with a terminal portion and a color filter substrate with a common electrode layer. The display panel further includes a first detection terminal and a second detection terminal arranged away from the terminal portion. Both the first detection terminal and the second detection terminal are electrically connected to the common electrode layer. The first detection terminal and the second detection terminal are electrically connected through a second electrical connection wire. In the present application, by arranging the first detection terminal and the second detection terminal, which are electrically connected through the second electrical connection wire, at a side away from the terminal portion, when the first detection terminal compensates for a voltage of the common electrode layer at a first position, the second detection terminal can simultaneously compensate for a voltage of the common electrode layer at a second position. Linkage compensation of the first detection terminal and the second detection terminal eliminates a technical problem of differences in display images of different regions of a large-size display panel.

DESCRIPTION OF DRAWINGS

Technical solutions and other beneficial effects of the present application will be apparent through detailed descriptions of specific embodiments of the present application in conjunction with accompanying drawings.

DETAILED DESCRIPTION OF PREFERRED EMBODIMENTS

Technical solutions in embodiments of the present application will be clearly and completely described below with reference to accompanying drawings in the embodiments of the present application. Obviously, the described embodiments are only a part of the embodiments of the present application, but not all of the embodiments. Based on the embodiments in the present application, all other embodiments obtained by those skilled in the art without creative work fall within the protection scope of the present application.

Refer to FIG. 1 to FIG. 6, the present application proposes a display panel 100, which includes an array substrate 10 and a color filter substrate 20 arranged opposite to the array substrate 10. The color filter substrate 20 includes a common electrode layer 210. The array substrate 10 includes a terminal portion 130. The display panel 100 further includes:

a first detection terminal 410 and a second detection terminal 420 arranged away from the terminal portion 130, both the first detection terminal 410 and the second detection terminal 420 being electrically connected to the common electrode layer 210;

first electrical connection wires 431, the first detection terminal 410 and the second detection terminal 420 being respectively electrically connected to the terminal portion 130 through the corresponding first electrical connection wires 431; and a second electrical connection wire 432, the first detection terminal 410 and the second detection terminal 420 being electrically connected through the second electrical connection wire 432.

In the present application, by arranging the first detection terminal 410 and the second detection terminal 420, which are electrically connected through the second electrical connection wire 432, at a side away from the terminal portion 130, when the first detection terminal 410 compensates for a voltage of the common electrode layer 210 at a first position, the second detection terminal 420 can simultaneously compensate for a voltage of the common electrode layer 210 at a second position. Linkage compensation of the first detection terminal 410 and the second detection terminal 420 eliminates a technical problem of differences in display images of different regions of a large-sized display panel 100.

The technical solutions of the present application will now be described with reference to specific embodiments.

Figure 1:
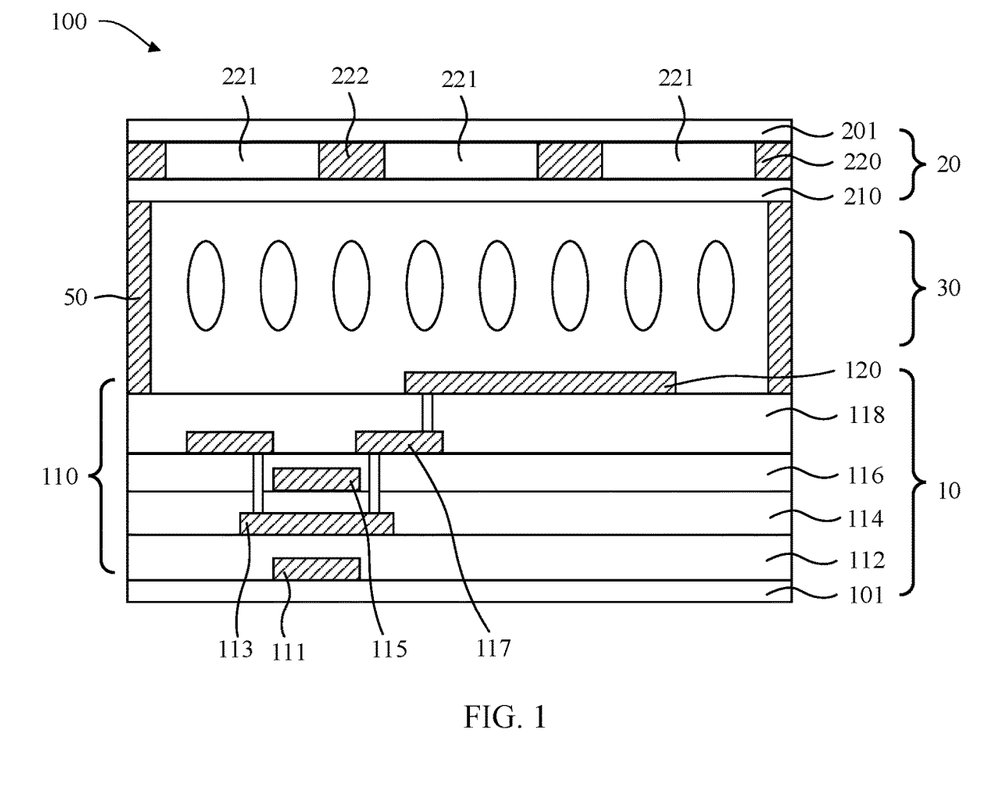
FIG. 1 is a first cross-sectional structural diagram of a display panel of the present application.

Please refer to FIG. 1, the display panel 100 includes the array substrate 10, the color filter substrate 20 arranged opposite to the array substrate 10, and a liquid crystal layer 30 arranged between the array substrate 10 and the color filter substrate 20.

In this embodiment, the array substrate 10 includes a first substrate 101, an array driving layer 110 arranged on the first substrate 101, and a pixel electrode layer 120 arranged on the array driving layer 110.

In this embodiment, the first substrate 101 may be one of a rigid substrate or a flexible substrate. When the first substrate 101 is the rigid substrate, a material of the first substrate 101 may be made of materials such as glass and quartz. When the first substrate 101 is the flexible substrate, the first substrate 101 may be a material such as polyimide. In a liquid crystal display panel 100, a base structure of the display panel 100 is generally set as the rigid substrate, which will not be described in detail here.

In this embodiment, the array substrate 10 may be a conventional array substrate 10 or a color filter on array (COA, a substrate in which the color filter layer 220 is arranged on the array substrate 10), which is not specifically limited in the present application. In the following embodiments, the present application first takes the conventional array substrate 10 as an example for description.

The array driving layer 110 may include a plurality of thin-film transistor. The thin-film transistor may be an etch-stop type, a back-channel-etch type, or may be divided into structures such as a bottom gate thin-film transistor, top gate thin-film transistor, or the like according to positions of a gate and an active layer 113, which are not specifically limited. For example, the thin-film transistor shown in FIG.

1 is a top gate type thin-film transistor. The thin-film transistor may include a light shielding layer 111 arranged on the first substrate 101, a buffer layer 112 arranged on the light shielding layer 111, the active layer 113 arranged on the buffer layer 112, a gate insulating layer 114 arranged on the active layer 113, a gate layer 115 arranged on the gate insulating layer 114, an interlayer insulating layer 116 arranged on the gate layer 115, a source and drain layer 117 arranged on the interlayer insulating layer 116, and a passivation layer 118 arranged on the source and drain layer 117.

In this embodiment, the pixel electrode layer 120 is electrically connected to a source/drain electrode in the source and drain layer 117 through a via hole of the passivation layer 118. The pixel electrode layer 120 is used to provide a third voltage for a deflection of liquid crystal molecules in the liquid crystal layer 30.

In this embodiment, a material of the pixel electrode layer 120 may be made of a transparent conductive material, such as indium tin oxide.

In this embodiment, the color filter substrate 20 includes a second substrate 201, a color filter layer 220 arranged on the second substrate 201, and a common electrode layer 210 arranged on the color filter layer 220.

In this embodiment, the color filter layer 220 may include at least three color resist units 221 and a light shielding unit 222 arranged between two adjacent color resist units 221. One of the color resist units 221 corresponds to one pixel unit. The color resist unit 221 may be one of a red color resist, a green color resist, or a blue color resist. The light shielding unit 222 is arranged between two adjacent color resist units 221.

In this embodiment, the common electrode layer 210 is used to provide a fourth voltage for the deflection of the liquid crystal molecules. The fourth voltage is a constant voltage. The display panel 100 changes a voltage difference between two sides of the liquid crystal layer 30 by changing a magnitude of the third voltage, so that the liquid crystal molecules are deflected at different angles.

In this embodiment, a material of the common electrode layer 210 may be same as the material of the pixel electrode layer 120.

Figure 2:
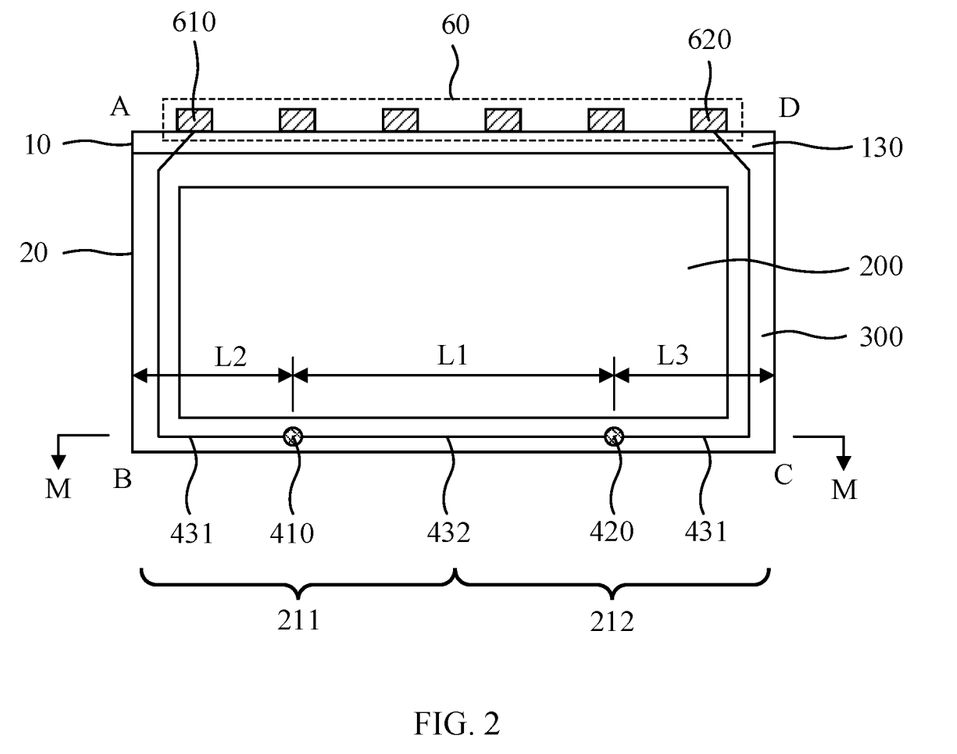
FIG. 2 is a first top view structural diagram of the display panel of the present application.

Please refer to FIG. 2. FIG. 2 is a top view structural diagram of the display panel 100 of the present application. An orthographic projection of the color filter substrate 20 on the array substrate 10 is located in the array substrate 10. An overlapping region of the color filter substrate 20 and the array substrate 10 is a display region 200 and a non-display region 300 around the display region 200. The terminal portion 130 is provided in a non-overlapping region of the color filter substrate 20 and the array substrate 10, and the terminal portion 130 of the array substrate 10 is connected to an external chip.

Please refer to FIG. 1, the display panel 100 further includes a frame sealant 50 arranged between the array substrate 10 and the color filter substrate 20. The frame sealant 50 may be arranged in the display panel 100, and the frame sealant 50 may be arranged in an edge region of the display panel 100.

In this embodiment, in a direction of a top view of the display panel 100, both the first detection terminal 410 and the second detection terminal 420 are arranged to overlap with the frame sealant 50.

In this embodiment, the first detection terminal 410 is connected to a terminal in the terminal portion 130 through one of the first electrical connection wires 431 and is electrically connected to the external chip, and the second detection terminal 420 is connected to a terminal in the terminal portion 130 through the second electrical connection wire 432 and is electrically connected to the external chip.

In this embodiment, the first electrical connection wires 431 and the second electrical connection wire 432 are arranged in the non-display region 300, and the first electrical connection wires 431 and the second electrical connection wire 432 are covered by the frame sealant 50 and extend to corresponding detection terminals along arrangement of the frame sealant 50.

In this embodiment, the first detection terminal 410 is electrically connected to the second detection terminal 420 through the second electrical connection wire 432. The external chip exchanges data with the first detection terminal 410 and the second detection terminal 420 through the first electrical connection wires 431 and the second electrical connection wire 432. For example, the first detection terminal 410 and the second detection terminal 420 transmit a detection result to the external chip through the first electrical connection wires 431, and the external chip transmits a compensation voltage to the first detection terminal 410 and the second detection terminal 420.

In this embodiment, the external chip may be a power management chip 60. The power management chip may include a first power chip 610 and a second power chip 620. The first power chip 610 is electrically connected to the first detection terminal 410 through one of the first electrical connection wires 431. The second power chip 620 is electrically connected to the second detection terminal 420 through another one of the first electrical connection wires 431.

In this embodiment, in the direction of the top view of the display panel 100, the second electrical connection wire 432 is arranged to overlap with the frame sealant 50.

In the display panel 100 of the present application, the first electrical connection wires 431 are arranged on the array substrate 10, and the second electrical connection wire 432 is arranged on the array substrate 10 or the color filter substrate 20. For example, the first electrical connection wires 431 are arranged on the array substrate 10. That is, the first electrical connection wires 431 may be arranged in a same layer as a metal layer on the array substrate 10. The second electrical connection wire 432 is arranged on the color filter substrate 20. That is, the second electrical connection wire 432 may be arranged in a same layer as a metal layer on the color filter substrate 20, or a metal layer may be provided on the color filter substrate 20 separately. Alternatively, both the first electrical connection wires 431 and the second electrical connection wire 432 are arranged on the array substrate 10.

In the display panel 100 of the present application, please refer to FIG. 1, the array substrate 10 may include the light shielding layer 111, the gate layer 115, the source and drain layer 117, and the pixel electrode layer 120. The first electrical connection wires 431 and the second electrical connection wire 432 may be arranged in a same layer as one of the light shielding layer 111, the gate layer 115, the source and drain layer 117, and the pixel electrode layer 120.

Figure 3:
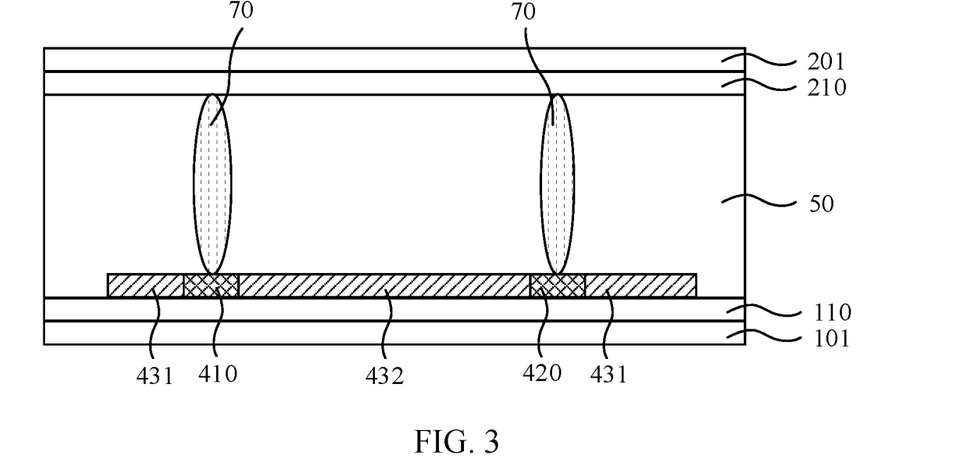
FIG. 3 is a cross-sectional view of a section MM in FIG. 2.

Please refer to FIG. 3. FIG. 3 is a sectional view of a section MM in FIG. 2. The first detection terminal 410 is electrically connected to the second detection terminal 420 through the second electrical connection wire 432. The second electrical connection wire 432 is arranged on the gate insulating layer 114. That is, the second electrical connection wire 432 may be arranged in a same layer as a metal layer of the gate layer 115. That is, the second electrical connection wire 432 and the gate layer 115 may be formed in a same process.

In the structure of FIG. 3, the first detection terminal 410 or/and the second detection terminal 420 include metal balls 70. The metal balls 70 is arranged in the frame sealant 50. The metal balls 70 extends from the array substrate 10 towards the color filter substrate 20, and the metal balls 70 electrically connect the first electrical connection wires 431 and the common electrode layer 210.

In this embodiment, the first electrical connection wires 431 and the second electrical connection wire 432 may be arranged in a same layer. That is, both the first electrical connection wires 431 and the second electrical connection wire 432 may be arranged on the passivation layer 118. That is, the first electrical connection wires 431 and the second electrical connection wire 432 and the pixel electrode layer 120 may be formed in a same process.

Please refer to FIG. 2, the display panel 100 includes a first boundary AB, a second boundary CD, a third boundary AD, and a fourth boundary BC. The first boundary AB and the second boundary CD are opposite and parallel to each other. The third boundary AD and the fourth boundary BC are opposite and parallel to each other. The third boundary AD is close to the terminal portion 130. The fourth boundary BC is away from the terminal portion 130. The first detection terminal 410 and the second detection terminal 420 are arranged close to the fourth boundary BC.

In this embodiment, a distance between the first detection terminal 410 and the second detection terminal 420 in a first direction X is a first distance L1, a distance between the first detection terminal 410 and the adjacent first boundary AB in the first direction X is a second distance L2, and a distance between the second detection terminal 420 and the adjacent second boundary CD in the first direction X is a third distance L3. A sum of the second distance L2 and the third distance L3 may be equal to the first distance L1.

In this embodiment, the second distance L2 and the third distance L3 may be equal, so that a duration of data exchanging between the first detection terminal 410 and the first power chip 610 is equal to a duration of data exchanging between the second detection terminal 420 and the second power chip 620.

In this embodiment, the first direction X may be perpendicular to the first boundary AB or the second boundary CD.

In this embodiment, the common electrode layer 210 includes a first region 211 and a second region 212. The first detection terminal 410 is arranged on a center line of the first region 211, and the second detection terminal 420 is arranged on a center line of the second region 212. Due to an influence of resistance and capacitance, voltages of different regions in the common electrode layer 210 are different. Therefore, the first detection terminal 410 and the second detection terminal 420 are arranged on the center lines of the corresponding regions, and voltages on the center lines are determined as detection voltages of the detection terminals, which can reduce an error of voltage compensation to the utmost content.

In solutions of FIG. 1 to FIG. 3, data collection at corresponding points of the first detection terminal 410 and the second detection terminal 420 is real-time collection, and a time interval of the data collection can be set according to requirements. During a data collection process of the first detection terminal 410 and the second detection terminal 420, a working process of the first detection terminal 410 and the second detection terminal 420 of the present application is as follows:

A target voltage of the common electrode layer 210 in the display panel 100 is obtained. In this step, the target voltage may be a working voltage of the common electrode layer 210. For example, when the working voltage of the common electrode layer 210 is 2 volts (V), the target voltage of the common electrode layer 210 may be 2V.

The first detection terminal 410 is used to obtain a first voltage of the common electrode layer 210 at the first position, and the second detection terminal 420 is used to obtain a second voltage of the common electrode layer 210 at the second position. In this step, the first detection terminal 410 and the second detection terminal 420 obtain voltages of the corresponding positions in real time. Due to the influence of resistance and capacitance, voltages in different regions of the common electrode layer 210 will deviate from the target voltage. Thus, a corresponding compensation voltage value and a corresponding compensation position can be obtained according to a comparison between the real-time detected voltages and the target voltage.

A first difference between the first voltage and the target voltage and a second difference between the second voltage and the target voltage are obtained. When the first difference or/and the second difference are greater than a threshold voltage, the corresponding detection terminal is used to compensate for the voltage of the common electrode layer 210;

In this step, when the first difference is greater than the threshold voltage and the second difference is smaller than the threshold voltage, since the first detection terminal 410 and the second detection terminal 420 are electrically connected, results measured by both the first detection terminal 410 and the second detection terminal 410 will be transmitted to the first power supply chip 610 and the second power supply chip 620. Since the voltage in a region where the first detection terminal 410 is located is abnormal, the first power supply chip 610 will input a corresponding compensation voltage according to a voltage measured by the first detection terminal 410. For example, if the voltage measured by the first detection terminal 410 deviates from the target voltage by 0.5V, the first power chip 610 can transmit 0.5V of the compensation voltage to the first detection terminal 410. In addition, since a deviation of the voltage in a region where the second detection terminal 420 is located from the target voltage is relatively small, the second power chip 620 will not input the compensation voltage to the second detection terminal 420. Finally, since the first detection terminal 410 and the second detection terminal 420 are electrically connected, after the first detection terminal 410 receives the compensation voltage of the first power supply chip 610, the second detection terminal 420 also receives the compensation voltage of the first power supply chip 610. Since a transmission distance between the first power chip 610 and the second detection terminal 420 is relatively large, the compensation voltage transmitted from the first power chip 610 to the second detection terminal 420 will be smaller than the compensation voltage received by the first detection terminal 410. That is, a voltage compensation of the first power supply chip 610 to the common electrode layer 210 at the first position has a relatively small influence on the voltage of the common electrode layer 210 at the second position.

In this step, when the first difference value is smaller than the threshold voltage and the second difference value is greater than the threshold voltage, since the first detection terminal 410 and the second detection terminal 420 are electrically connected, the results measured by both the first detection terminal 410 and the second detection terminal 420 will be transmitted to the first power supply chip 610 and the second power supply chip 620. Since the voltage in the region where the second detection terminal 420 is located is abnormal, the second power supply chip 620 will input a corresponding compensation voltage according to the voltage measured by the second detection terminal 420. Since a deviation of the voltage in the region where the first detection terminal 410 is located from the target voltage is relatively small, the first power chip 610 will not input the compensation voltage to the first detection terminal 410.

In this step, when both the first difference value and the second difference value are greater than the threshold voltage, since the first detection terminal 410 and the second detection terminal 420 are electrically connected, the results measured by both the first detection terminal 410 and the second detection terminal 410 will be transmitted to the first power chip 610 and the second power chip 620. Thus, the first power chip 610 and the second power chip 620 can simultaneously receive abnormal voltage signals measured by both the first detection terminal 410 and the second power chip 620. The first power supply chip 610 can simultaneously input the compensation voltage to the first detection terminal 410 and the second detection terminal 420, and the second power supply chip 620 can simultaneously input the compensation voltage to the first detection terminal 410 and the second detection terminal 420. The linkage compensation of the first detection terminal 410 and the second detection terminal 420 speeds up voltage compensation rates of the common electrode layer in the regions where the first detection terminal 410 and the second detection terminal 420 are located, and eliminates the technical problem of differences in display images of different regions of the large-size display panel 100.

Figure 4:
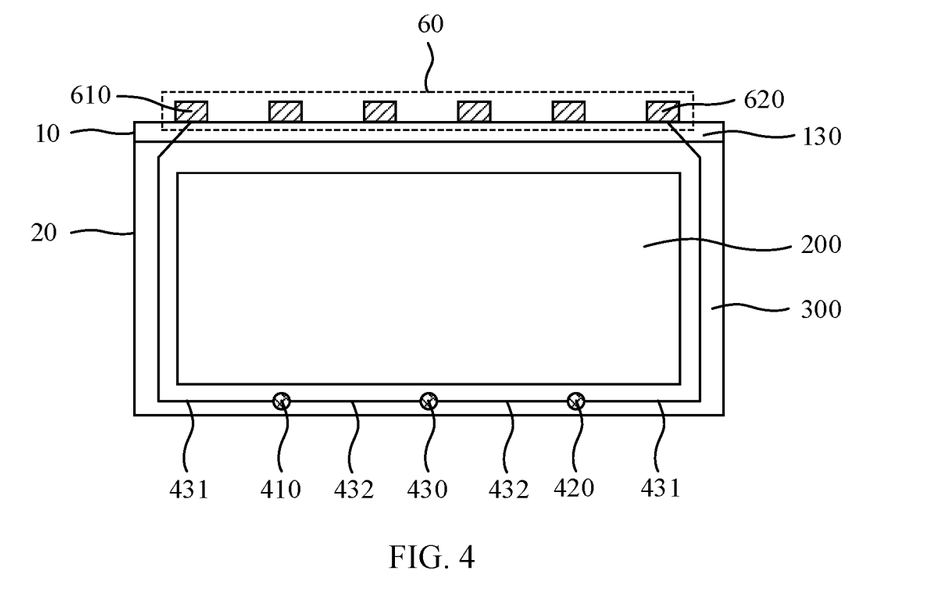
FIG. 4 is a second top view structural diagram of the display panel of the present application.

In the display panel 100 of the present application, please refer to FIG. 4, the display panel 100 further includes a third detection terminal 430. The third detection terminal 430 is arranged between the first detection terminal 410 and the second detection terminal 420. The third detection terminal 430 is respectively electrically connected to the first detection terminal 410 and the second detection terminal 420 through the second electrical connection wire 432.

In this embodiment, when a size of the display panel 100 is large enough, such as a panel size of 65 inches, 75 inches, and above, two test terminals cannot meet compensation requirements for the display panel 100. Setting of a third test terminal reduces a region compensated by a single test terminal and improves compensation accuracy.

In this embodiment, a distance between the third detection terminal 430 and the first detection terminal 410 in the first direction X is equal to a distance between the third detection terminal 430 and the second detection terminal 420 in the first direction.

In this embodiment, a signal detected by the third detection terminal 430 will be sent to the first power chip 610 and the second power chip 620 simultaneously, and the first power chip 610 and the second power chip 610 transmit compensation voltages to the third detection terminal 430 according to voltage data measured by both the first detection terminal 410 and the second detection terminal 420.

For example, when deviations of voltages in the regions where the first detection terminal 410 and the third detection terminal 430 are located from the target voltage are relatively large, and the deviation of voltage in the region where the second detection terminal 420 is located from the target voltage is relatively small, the first power chip 610 inputs a compensation voltage to the first detection terminal 410 and the third detection terminal 430. When deviations of voltages in the regions where the second detection terminal 420 and the third detection terminal 430 are located from the target voltage are relatively large, and the deviation of the voltage in the region where the first detection terminal 410 is located from the target voltage is relatively small, the second power chip 620 inputs a compensation voltage to the second detection terminal 420 and the third detection terminal 430. When all the deviations of the voltages in the regions where the first detection terminal 410, the second detection terminal 420, and the third detection terminal 430 are located from the target voltage are relatively large, the first power supply chip 610 and the second power supply chip 620 simultaneously input compensation voltages to the first detection terminal 410, the second detection terminal 420, and the third detection terminal 430.

Figure 5:
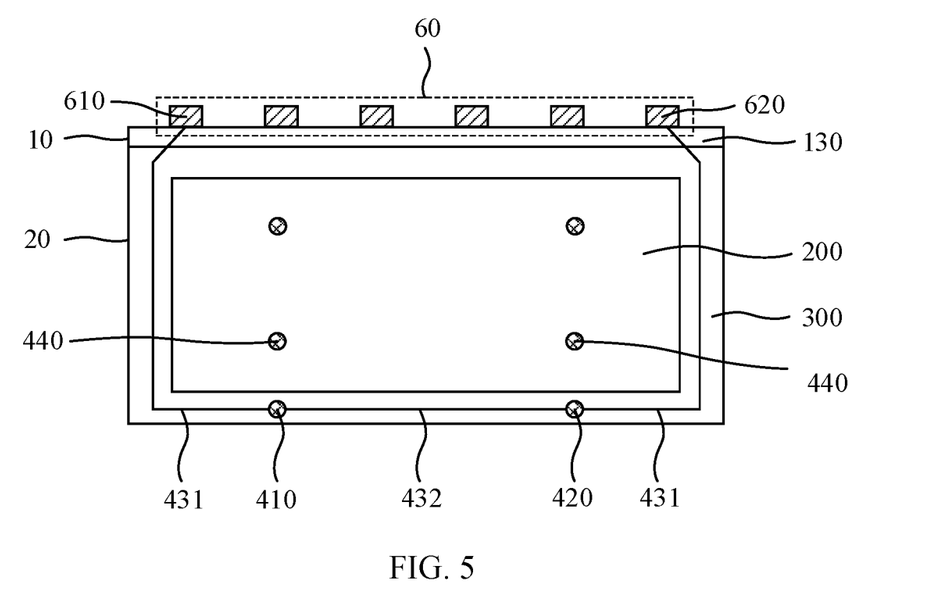
FIG. 5 is a third top view structural diagram of the display panel of the present application.
Figure 6:
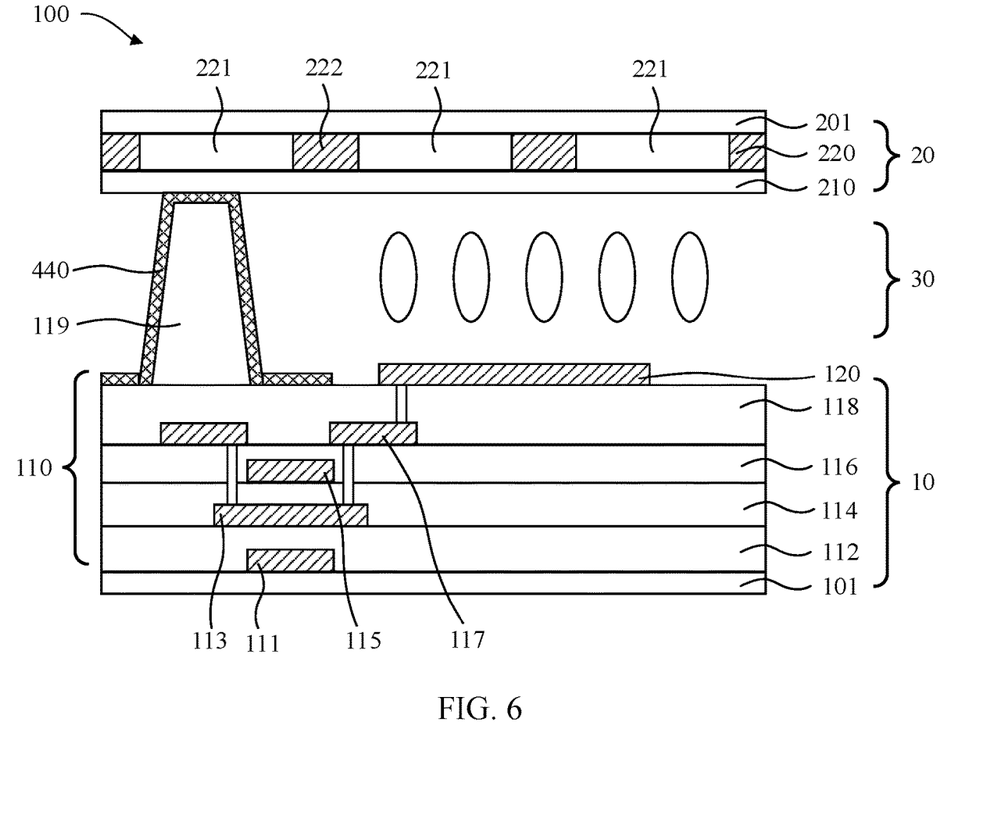
FIG. 6 is a second cross-sectional structural diagram of the display panel of the present application.

In the display panel 100 of the present application, please refer to FIG. 5 and FIG. 6, the display panel 100 further includes a fourth detection terminal 440 arranged in the display region 200, and the fourth detection terminal 440 is used to detect and compensate for a voltage of the common electrode layer 210 in the display region 200.

In this embodiment, the fourth detection terminal 440 and the pixel electrode layer 120 may be arranged in a same layer.

In this embodiment, the display panel 100 further includes a support column 119 arranged on the array substrate 10. The fourth detection terminal 440 may lap over the support column 119 and may be electrically connected to the common electrode layer 210.

In this embodiment, the fourth detection terminal 440 is non-electrically connected to the first detection terminal 410 and the second detection terminal 420, and may be directly connected to the power management chip 60. The fourth detection terminal 440, the first detection terminal 410, and the second detection terminal 420 compensate in a non-linkage manner.

Figure 7:
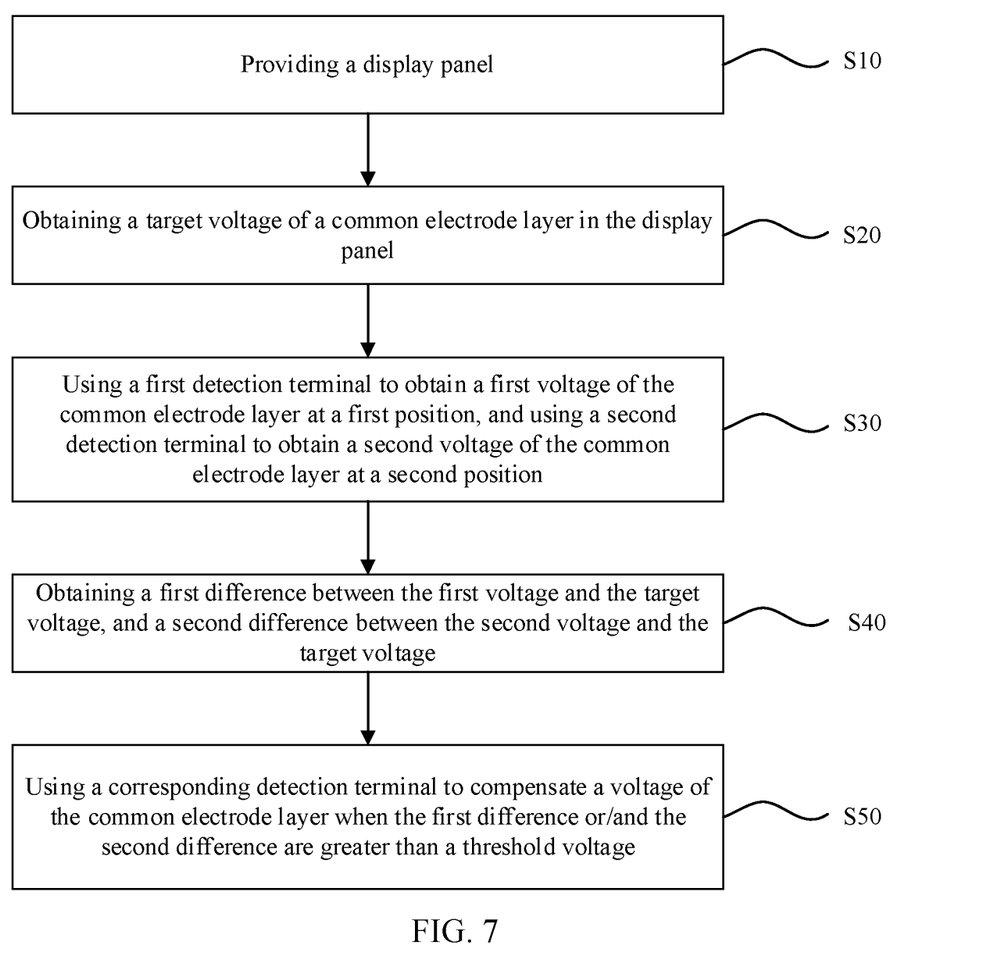
FIG. 7 is a step diagram of a driving method for the display panel of the present application.

Please refer to FIG. 7, the present application further provides a driving method for the display panel 100, which includes:

S10: providing the above-mentioned display panel 100.

S20: obtaining the target voltage of the common electrode layer 210 in the display panel 100.

In this step, the target voltage may be the working voltage of the common electrode layer 210. For example, when the working voltage of the common electrode layer 210 is 2V, the target voltage of the common electrode layer 210 may be 2V.

S30: using the first detection terminal 410 to obtain the first voltage of the common electrode layer 210 at the first position, and using the second detection terminal 420 to obtain the second voltage of the common electrode layer 210 at the second position.

In this step, the first detection terminal 410 and the second detection terminal 420 obtain the voltages of the corresponding positions in real time. Due to the influence of resistance and capacitance, the voltages in different regions of the common electrode layer 210 will deviate from the target voltage. Thus, the corresponding compensation voltage value and compensation position can be obtained according to the comparison between the real-time detected voltages and the target voltage.

S40: obtaining the first difference between the first voltage and the target voltage and the second difference between the second voltage and the target voltage.

S50, using the corresponding detection terminal to compensate for the voltage of the common electrode layer 210 when the first difference or/and the second difference are greater than the threshold voltage.

In this step, when the first difference is greater than the threshold voltage, the first detection terminal 410 is used to compensate for the voltage of the common electrode layer 210 at the first position. Alternatively, when the second difference is greater than the threshold voltage, the second detection terminal 420 is used to compensate for the voltage of the common electrode layer 210 at the second position. Alternatively, when both the first difference and the second difference are greater than the threshold voltage, the first detection terminal 410 is used to compensate for the voltage of the common electrode layer 210 at the first position, and the second detection terminal 420 is used to compensate for the voltage of the common electrode layer 210 at the second position. For a specific working process, please refer to the working process of the display panel 100 described above.

The present application proposes the display panel and the driving method thereof. The display panel includes the array substrate with the terminal portion and the color filter substrate with a common electrode layer. The display panel further includes the first detection terminal and the second detection terminal arranged away from the terminal portion. Both the first detection terminal and the second detection terminal are electrically connected to the common electrode layer. The first detection terminal and the second detection terminal are electrically connected through the second electrical connection wire. In the present application, by arranging the first detection terminal and the second detection terminal, which are electrically connected through the second electrical connection wire, at the side away from the terminal portion, when the first detection terminal compensates for the voltage of the common electrode layer at the first position, the second detection terminal can simultaneously compensate for the voltage of the common electrode layer at the second position. Linkage compensation of the first detection terminal and the second detection terminal eliminates the technical problem of differences in display images of different regions of the large-sized display panel.

In the above-mentioned embodiments, the description of each embodiment is provided with its emphasis. For parts that are not described in detail in a certain embodiment, reference may be made to relevant descriptions of other embodiments.

The display panel and the driving method thereof provided by the embodiments of the present application have been described in detail above. The principles and implementations of the present application are described with specific examples. The description of the above embodiments is only used to help understand the technical solutions applied and the core idea of the present application. Those of ordinary skill in the art should understand that: they can still modify the technical solutions described in the foregoing embodiments, or perform equivalent replacements to some technical features; however, these modifications or replacements do not make the essence of the corresponding technical solutions deviate from the scope of the technical solutions of the embodiments of the present application.

What is claimed is:

1. A display panel, comprising an array substrate and a color filter substrate arranged opposite to the array substrate, the color filter substrate comprising a common electrode layer, and the array substrate comprising a terminal portion;
wherein the display panel further comprises:
a first detection terminal and a second detection terminal arranged away from the terminal portion, both the first detection terminal and the second detection terminal being electrically connected to the common electrode layer;
first electrical connection wires, the first detection terminal and the second detection terminal being respectively electrically connected to the terminal portion through the corresponding first electrical connection wires; and
a second electrical connection wire, the first detection terminal and the second detection terminal being electrically connected through the second electrical connection wire.

2. The display panel according to claim 1, wherein the display panel further comprises a frame sealant arranged between the array substrate and the color filter substrate;
wherein in a direction of a top view of the display panel, both the first detection terminal and the second detection terminal are arranged to overlap with the frame sealant.

3. The display panel according to claim 2, wherein the first electrical connection wires are arranged on the array substrate, and the second electrical connection wire is arranged on the array substrate or the color filter substrate.

4. The display panel according to claim 3, wherein the array substrate comprises a light shielding layer, a gate layer, and a source and drain layer;
wherein the first electrical connection wires and the second electrical connection wire are arranged in a same layer as one of the light shielding layer, the gate layer, and the source and drain layers.

5. The display panel according to claim 3, wherein the first detection terminal or/and the second detection terminal comprise metal balls arranged in the frame sealant, the metal balls extend from the array substrate toward the color filter substrate, and the metal balls electrically connect the first electrical connection wires and the common electrode layer.

6. The display panel according to claim 3, wherein a distance between the first detection terminal and the second detection terminal in a first direction is a first distance, a distance between the first detection terminal and an adjacent first boundary in the first direction is a second distance, and a distance between the second detection terminal and an adjacent second boundary in the first direction is a third distance; and
the first boundary and the second boundary are opposite and parallel boundaries of the display panel, and the first direction is perpendicular to the first boundary or the second boundary;
wherein a sum of the second distance and the third distance is equal to the first distance.

7. The display panel according to claim 3, wherein the display panel further comprises:
a third detection terminal, wherein the third detection terminal is arranged between the first detection terminal and the second detection terminal, and the third detection terminal is respectively electrically connected to the first detection terminal and the second detection terminal through the second electrical connection wire.

8. The display panel according to claim 7, wherein a distance between the third detection terminal and the first detection terminal in the first direction is equal to a distance between the third detection terminal and the second detection terminal in the first direction.

9. The display panel according to claim 7, wherein the display panel further comprises:
a pixel electrode layer arranged on the array substrate;

a fourth detection terminal arranged in a display region of the display panel, the fourth detection terminal and the pixel electrode layer being arranged in a same layer; and a support column arranged on the array substrate;

wherein the fourth detection terminal laps over the support column and is electrically connected to the common electrode layer.

10. A driving method for a display panel, comprising:

providing the display panel comprising an array substrate and a color filter substrate arranged opposite to the array substrate, the color filter substrate comprising a common electrode layer, and the array substrate comprising a terminal portion, wherein the display panel further comprises:

a first detection terminal and a second detection terminal arranged away from the terminal portion, both the first detection terminal and the second detection terminal being electrically connected to the common electrode layer;

first electrical connection wires, the first detection terminal and the second detection terminal being respectively electrically connected to the terminal portion through the corresponding first electrical connection wires; and a second electrical connection wire, the first detection terminal and the second detection terminal being electrically connected through the second electrical connection wire;

obtaining a target voltage of the common electrode layer in the display panel;

using the first detection terminal to obtain a first voltage of the common electrode layer at a first position, and using the second detection terminal to obtain a second voltage of the common electrode layer at a second position;

obtaining a first difference between the first voltage and the target voltage and a second difference between the second voltage and the target voltage; and using a corresponding detection terminal to compensate for a voltage of the common electrode layer when the first difference or/and the second difference are greater than a threshold voltage.

11. The driving method for the display panel according to claim 10, wherein the display panel further comprises a frame sealant arranged between the array substrate and the color filter substrate;

wherein in a direction of a top view of the display panel, both the first detection terminal and the second detection terminal are arranged to overlap with the frame sealant.

12. The driving method for the display panel according to claim 11, wherein the first electrical connection wires are arranged on the array substrate, and the second electrical connection wire is arranged on the array substrate or the color filter substrate.

13. The driving method for the display panel according to claim 12, wherein the array substrate comprises a light shielding layer, a gate layer, and a source and drain layer;

wherein the first electrical connection wires and the second electrical connection wire are arranged in a same layer as one of the light shielding layer, the gate layer, and the source and drain layers.

14. The driving method for the display panel according to claim 12, wherein the first detection terminal or/and the second detection terminal comprise metal balls arranged in the frame sealant, and the metal balls extend from the array substrate toward the color filter substrate, and the metal balls electrically connect the first electrical connection wires and the common electrode layer.

15. The driving method for the display panel according to claim 12, wherein a distance between the first detection terminal and the second detection terminal in a first direction is a first distance, a distance between the first detection terminal and an adjacent first boundary in the first direction is a second distance, and a distance between the second detection terminal and an adjacent second boundary in the first direction is a third distance; and the first boundary and the second boundary are opposite and parallel boundaries of the display panel, and the first direction is perpendicular to the first boundary or the second boundary;

wherein a sum of the second distance and the third distance is equal to the first distance.

16. The driving method for the display panel according to claim 12, wherein the display panel further comprises:

a third detection terminal, wherein the third detection terminal is arranged between the first detection terminal and the second detection terminal, and the third detection terminal is respectively electrically connected to the first detection terminal and the second detection terminal through the second electrical connection wire.

17. The driving method for the display panel according to claim 16, wherein a distance between the third detection terminal and the first detection terminal in the first direction is equal to a distance between the third detection terminal and the second detection terminal in the first direction.

18. The driving method for the display panel according to claim 16, wherein the display panel further comprises:

a pixel electrode layer arranged on the array substrate;

a fourth detection terminal arranged in a display region of the display panel, the fourth detection terminal and the pixel electrode layer being arranged in a same layer; and a support column arranged on the array substrate;

wherein the fourth detection terminal laps over the support column and is electrically connected to the common electrode layer.

* * * * *